(12) United States Patent
Yamanaka

(10) Patent No.: US 8,218,755 B2
(45) Date of Patent: Jul. 10, 2012

(54) ACCESS-FREQUENCY ESTIMATING APPARATUS AND COMPUTER PRODUCT

(75) Inventor: Hideki Yamanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 692 days.

(21) Appl. No.: 12/408,034

(22) Filed: Mar. 20, 2009

(65) Prior Publication Data

US 2009/0304174 A1   Dec. 10, 2009

(30) Foreign Application Priority Data

Jun. 5, 2008  (JP) .................................. 2008-147961

(51) Int. Cl.
  *H04M 3/00* (2006.01)
  *H04M 5/00* (2006.01)
  *H04M 15/00* (2006.01)
(52) U.S. Cl. .............. 379/266.08; 379/133; 379/266.06; 379/266.07; 379/266.1
(58) Field of Classification Search ............... 379/266.1, 379/88.22, 133, 111, 266.08, 266.06, 242, 379/265.05, 266.07
See application file for complete search history.

(56) References Cited

U.S. PATENT DOCUMENTS 6,580,787 B1 * 6/2003 Akhteruzzaman et al. .......................... 379/88.22
7,142,652 B2 * 11/2006 Ho ................................ 379/133

FOREIGN PATENT DOCUMENTS

| JP | A 2006-254094 | 9/2006 |
| JP | A 2007-142502 | 6/2007 |
| JP | A 2007-189329 | 7/2007 |

* cited by examiner

*Primary Examiner* — Thjuan K Addy
(74) *Attorney, Agent, or Firm* — Greer, Burns & Crain, Ltd

(57) ABSTRACT

An access-frequency estimating apparatus includes a storage unit that stores hours outside operating hours and for which a second-degree derivative of access frequency distribution for contact centers whose business is similar to that of a contact center subject to estimation is nearly 0, and a coefficient indicating relation between access frequency during operating hours of the other contact centers and access frequency outside the operating hours; an acquiring unit that acquires past access frequencies for operating hours of the contact center; an extracting unit that extracts, from the storage unit, a coefficient expressing relation between the access frequencies for the operating hours and an arbitrary hour outside the operating hours; a first calculating unit that calculates an estimated access frequency for the arbitrary hour of the contact center, based on the past access frequencies acquired and the coefficient; and an output unit that outputs the estimated the access frequency calculated.

6 Claims, 16 Drawing Sheets

FIG.6

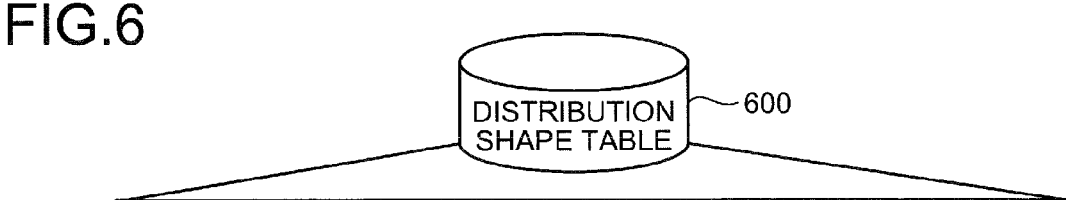

DISTRIBUTION SHAPE TABLE — 600

| | PARAMETER NAME | PARAMETER VALUE |
|---|---|---|
| 600-1 | EARLY-MORNING CALL START TIME | 7:00 |
| 600-2 | WORK START TIME | 9:00 |
| 600-3 | LUNCH-BREAK START TIME | 12:00 |
| 600-4 | WORK END TIME | 17:00 |
| 600-5 | EVENING-CALL INFLECTION TIME | 18:00 |
| 600-6 | NIGHT-CALL-CONVERGENCE ENDING TIME | 21:00 |
| 600-7 | EVENING CALL RATIO | 0.50 |
| 600-8 | MIDNIGHT CALL RATIO | 0.07 |
| 600-9 | IDENTICAL PERIOD | 21:00 ~ 7:00 |

FIG.7

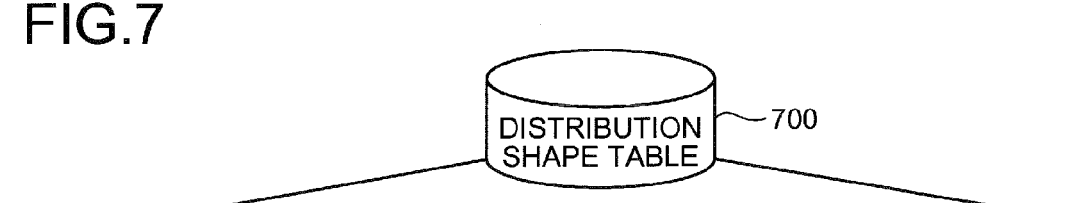

DISTRIBUTION SHAPE TABLE — 700

| | PARAMETER NAME | PARAMETER VALUE |
|---|---|---|
| 700-1 | EARLY-MORNING CALL START TIME | 7:00 |
| 700-2 | WORK START TIME | 9:00 |
| 700-3 | LUNCH-BREAK START TIME | 12:00 |
| 700-4 | WORK END TIME | 17:00 |
| 700-5 | EVENING-CALL INFLECTION TIME | 18:00 |
| 700-6 | NIGHT-CALL START TIME | 19:00 |
| 700-7 | NIGHT-CALL CONVERGENCE START TIME | 21:00 |
| 700-8 | NIGHT-CALL CONVERGENCE END TIME | 2:00 |
| 700-9 | EVENING CALL RATIO | 0.50 |
| 700-10 | NIGHT CALL RATIO | 0.45 |
| 700-11 | MIDNIGHT CALL RATIO | 0.07 |
| 700-12 | FIRST IDENTICAL PERIOD | 19:00 ~ 21:00 |
| 700-13 | SECOND IDENTICAL PERIOD | 21:00 ~ 7:00 |

| TIME | 9 | 10 | 11 | 12 | 13 | 14 | 15 | 16 |
|---|---|---|---|---|---|---|---|---|
| CALL FREQUENCY | CF(9) | CF(10) | CF(11) | CF(12) | CF(13) | CF(14) | CF(15) | CF(16) |

CALL-FREQUENCY DISTRIBUTION TABLE 900

| TIME | 0 | 1 | 2 | 3 | 4 | 5 | 6 | 7 | 8 | 9 | 10 | 11 |
|---|---|---|---|---|---|---|---|---|---|---|---|---|
| CALL FREQUENCY | null | null | null | null | null | null | null | null | null | CF(9) | CF(10) | CF(11) |
| TIME | 12 | 13 | 14 | 15 | 16 | 17 | 18 | 19 | 20 | 21 | 22 | 23 |
| CALL FREQUENCY | CF(12) | CF(13) | CF(14) | CF(15) | CF(16) | null | null | null | null | null | null | null |

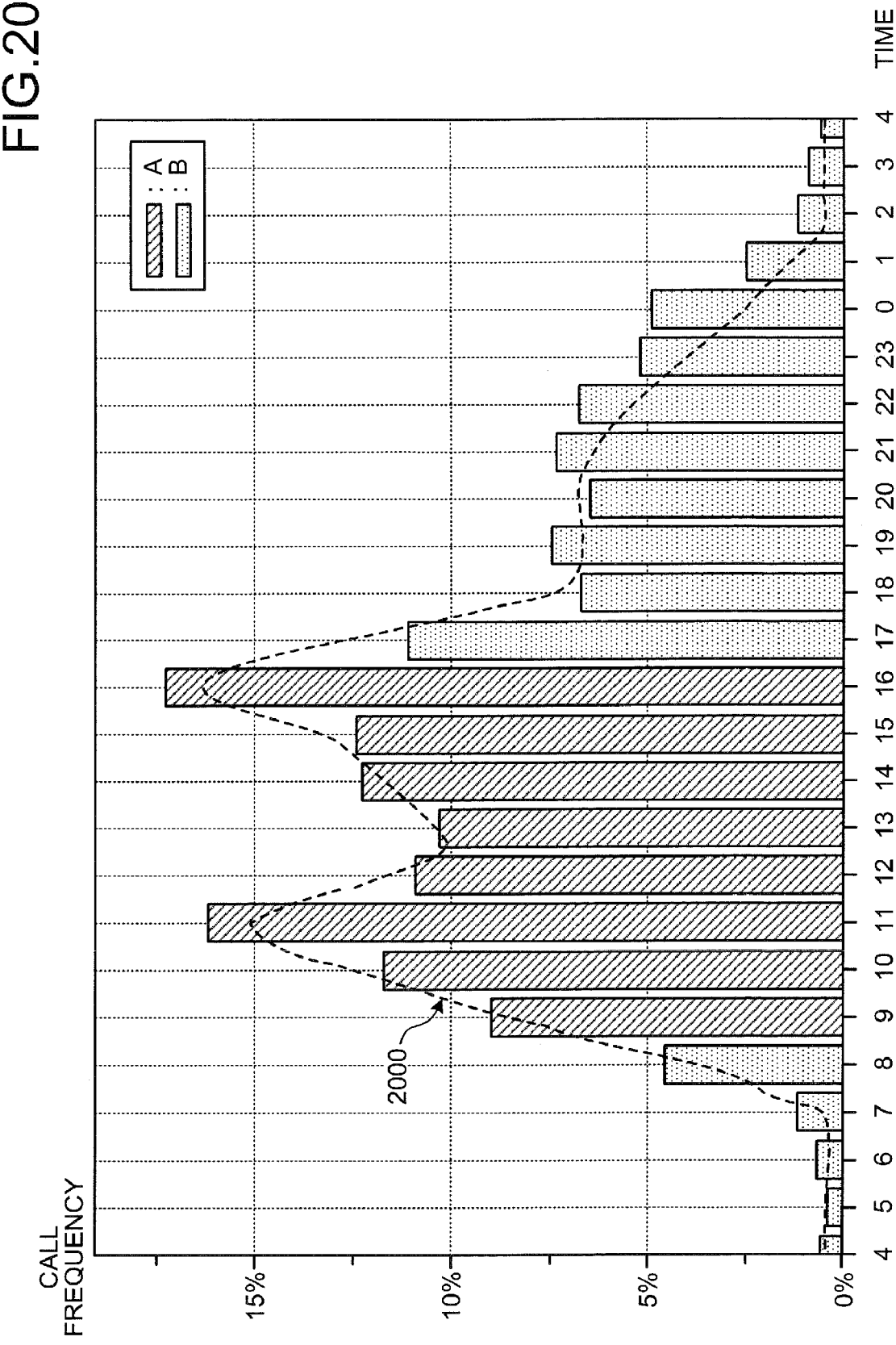

ACCESS-FREQUENCY ESTIMATING APPARATUS AND COMPUTER PRODUCT

CROSS REFERENCE TO RELATED APPLICATIONS

This application is based upon and claims the benefit of priority of the prior Japanese Patent Application No. 2008-147961, filed on Jun. 5, 2008, the entire contents of which are incorporated herein by reference.

FIELD

The embodiment discussed herein is related to estimating access-frequency to a contact center.

BACKGROUND

Generally, a contact center that receives customer inquiries such as questions, orders, and complaints is established in a company. Operators that deal with customer inquiries are placed in such a contact center. The number of operators placed in the contact center is determined based on past data (records of calls received from customers).

If the number of the operators is insufficient, the waiting time for customers is long, leading to increased abandoned calls, i.e., calls abandoned before being answered by an operator. Under such circumstances, it is impossible to respond to inquiries from customers satisfactorily, resulting in low customer satisfaction or loss of business opportunity.

On the other hand, if the number of operators is more than sufficient, personnel costs increase as well as other costs such as maintenance costs for the system and electricity costs. Consequently, measures are taken such as a review of working conditions to reduce costs and a reduction of personnel, leading to reduced morale among the operators.

Therefore, the number of operators to be placed in the contact center must be determined appropriately according to the number of received calls from customers. Conventionally, techniques of estimating the number of received calls from customers based on past records have been disclosed such as those described in for example, Japanese Laid-Open Patent Publication Nos. 2006-254094, 2007-142502, and 2007-189329.

For example, there is a technique of estimating the number of calls per hour based on a corrected number of calls calculated from the number of past calls each hour excluding the calls remade to the contact center because an operator could not answer the initial call.

Moreover, there is a technique in which the required number of operators is logically calculated using Erlang C formula corresponding to the number of calls, which varies according to hour and average handling time of an operator. The required number thus calculated is adjusted based on an estimated utilization according to an empirical rule of the administrator. Furthermore, there is a technique of estimating the number of customers that actually made calls, based on the average number of redials made by customers with respect to a service line and the number of calls received from customers.

However, the conventional techniques described above estimate the number of calls received during operating hours for which past records are available, using past records for calls received at a contact center. With such techniques, it is difficult to estimate changes in the number of calls received during extended operating hours if the operating hours of the contact center are extended because no records are available for hours beyond the operating hours.

Therefore, conventionally, changes in the number of calls during extended hours is estimated by guessing or the experience of an administrator of the contact center, and the number of operators to be placed in the contact center is acquired from the estimate. The number of operators is appropriately adjusted after the operation of the contact center has actually started, while accumulating record data.

However, such a method can still lead to reduced customer satisfaction and the loss of business opportunities, or increases in operating costs of the contact center due to an excessive number of personnel.

Furthermore, there is a method in which changes in the number of calls during extended operating hours is scaled based on past records of other companies in the same trade. However, it is difficult to achieve accurate scaling because patterns of the changes in the number of calls during the daytime (operating hours before extended hours) differ according contact center.

SUMMARY

According to an aspect of an embodiment, a computer-readable recording medium stores therein an access-frequency estimating program that causes a computer capable of accessing a table including hours that are outside operating hours and for which a second-degree derivative of access frequency distribution corresponding to contact centers whose business is similar to that of a contact center subject to estimation is nearly 0, and a coefficient that indicates relation between access frequency during operating hours of the other contact centers and access frequency outside the operating hours, to execute acquiring past access frequencies for operating hours of the contact center; extracting, from the table, a coefficient that expresses relation between access frequencies for the operating hours and an arbitrary hour selected from among the hours outside the operating hours; calculating an estimated access frequency for the arbitrary hour of the contact center, based on the past access frequencies acquired at the acquiring and the coefficient extracted at the extracting; and outputting the estimated access frequency calculated at the calculating.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram depicting data recorded in the distribution shape table;

FIG. 7 is another diagram depicting data recorded in the distribution shape table;

FIG. 20 is a diagram for explaining an estimation result concerning a contact center for end users having a number of abandoned calls.

DESCRIPTION OF EMBODIMENTS

Preferred embodiments of the present invention will be explained with reference to the accompanying drawings.

Figure 1:
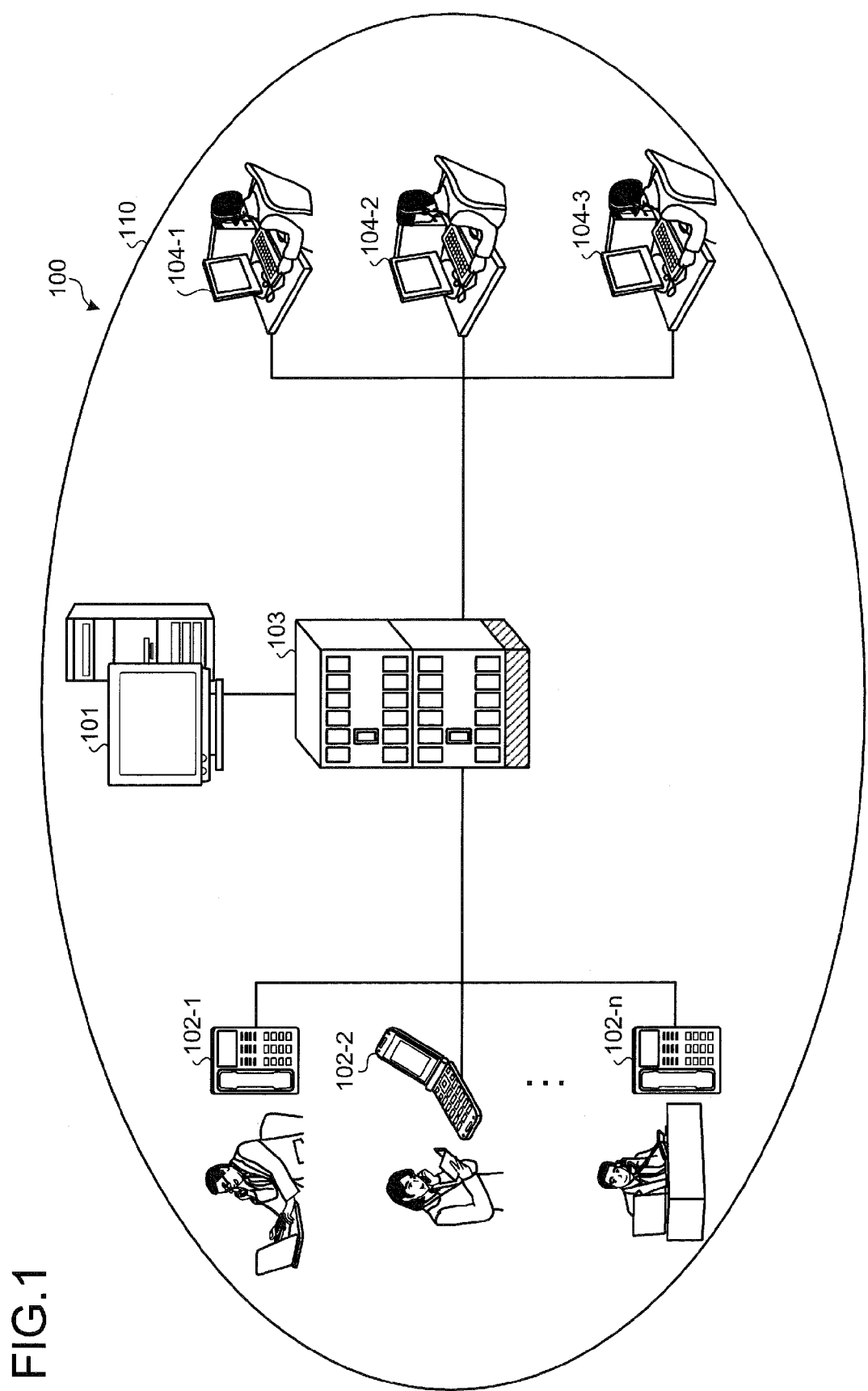
FIG. 1 is a system configuration diagram of a contact center according to an embodiment of the present invention.

FIG. 1 is a system configuration diagram of a contact center according to an embodiment of the present invention. As depicted in FIG. 1, in a contact center 100, an access-frequency estimating apparatus 101, user terminals 102-1 to 102-n, a switchboard 103, and operator terminals 104-1 to 104-3 are connected through a network 110 such as a telephone line, the Internet, a local area network (LAN) and a wide area network (WAN).

The contact center 100 is one section in a company that receives inquiries such as questions, orders, and complaints from customers. In the contact center 100, operators that deal with inquiries from customers are placed. The operators deal with the inquiries from customers using the operator terminals 104-1 to 104-3 (three terminals in the example depicted in FIG. 1).

The operator terminals 104-1 to 104-3 and the user terminals 102-1 to 102-n that are used by customers are connected through the switchboard 103. The switchboard 103 is a server that has a computer telephony integration (CTI) function to link a telephone and a computer device.

A basic operation of the contact center 100 is explained. First, a customer desiring to make an inquiry makes a phone call using the user terminals 102-1 to 102-n (fixed-line telephone, mobile telephone, etc.). A call from the user terminals 102-1 to 102-n is put in a queue of the switchboard 103.

The switchboard 103 detects, from among the operator terminals 104-1 to 104-3, a terminal that can answer the call, and assigns the call at the top of the queue to the detected among the operator terminal 104-1 to 104-3. At this time, if the number of calls exceeds the number of the operators, waiting by the customer(s) occurs until an available operator terminal 104-1 to 104-3 is detected.

A call disconnected during this waiting time (period in the queue) when a customer does not wait for an operator to answer is an abandoned call.

Generally, the quality of the contact center 100 is determined by the ratio of abandoned calls to the total arrival calls and the customer average waiting time. When the quality of the contact center 100 is degraded, a problem such as reduced customer satisfaction and loss of business opportunities is caused. Therefore, it is necessary to maintain a certain level of quality by placing an appropriate number of operators in the contact center 100.

Thus, changes in call frequency (or the number of calls) during the operating hours of the contact center 100 is estimated to obtain the number of operators to be placed. On the other hand, in recent years, to enhance customer satisfaction, demand for an extension of operating hours to nighttime has been increasing. However, for extended hours outside the operating hours, past records in which data on calls received from customers are accumulated are not available.

To acquire the number of operators to be placed in the contact center 100 during extended hours, an estimation of changes in call frequency for the extended hours is necessary. Therefore, conventionally, changes in call frequency during extended hours for which no records are available has been estimated, for example, by scaling.

However, because call frequency outside operating hours (during extended hours) of the contact center 100 cannot be estimated accurately by conventional methods such as scaling (details are explained with reference to FIG. 2) the appropriate number of operators to be placed in the contact center 100 cannot be obtained.

In the present embodiment, a method of accurately calculating an estimated value of call frequency outside operating hours from a past value of call frequency for the operating hours of the contact center is proposed. In the present specification, the operating hours of the contact center 100 is 9 a.m. to 5 p.m., and cases where the operating hours are extended to be 24 hours is explained as an example.

Figure 2:
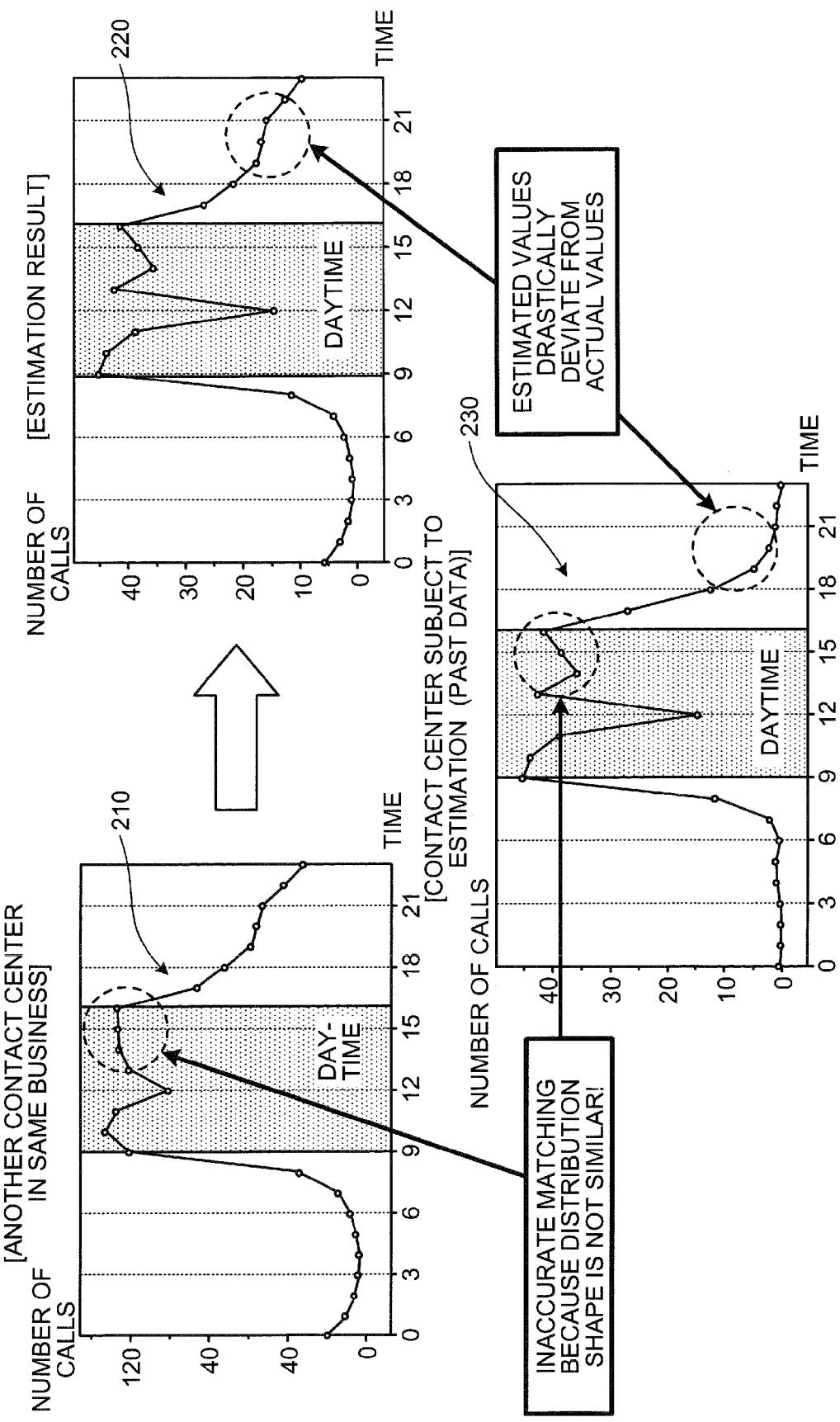
FIG. 2 is a diagram for explaining problems associated with scaling.

FIG. 2 is a diagram for explaining problems associated with scaling. Scaling is a method of estimating changes in call frequency occurring outside operating hours of a target contact center, based on past records of other companies in the same trade.

A curve 210 in FIG. 2 indicates transition of the number of calls by hour (24 hours) at a contact center of another company in the same trade. A curve 220 indicates transition of the number of calls at the target contact center estimated by scaling. A curve 230 indicates transition of the actual number of calls (track records) at the target contact center. In the scaling, matching is performed for daytime track record data (a period from 9 a.m. to 4 p.m. hatched in FIG. 2) between the target contact center and contact centers of other companies in the same trade, and track record data of a company among the other companies in the same trade whose distribution shape is similar to that of the target contact center is specified.

Scales of the specified hourly track record data (12 a.m. to 8 a.m. and 5 p.m. to 11 p.m.) of another company in the same trade are adjusted to fit transition of the number of calls during hours for which no track records are available (12 a.m. to 8 a.m. and 5 p.m. to 11 p.m.). However, the transition pattern of the number of calls during the day varies according to contact center even among companies in the same trade.

Therefore, the matching of the hours for the daytime is not accurate, and as a result, estimation of the number of calls during hours for which no track records are available (for example, from 6 p.m. to 9 p.m.) can yield a value far from the actual value. Thus, in the conventional technique, it is difficult to accurately obtain the number of operators to be placed during extended hours.

A key hour that characterizes the distribution shape of call frequency (during 24 hours) of a contact center (for example, the contact center 100) is explained. The call frequency is obtained by dividing the number of calls from customers during each hour by the total number of calls for the day.

Figure 3:
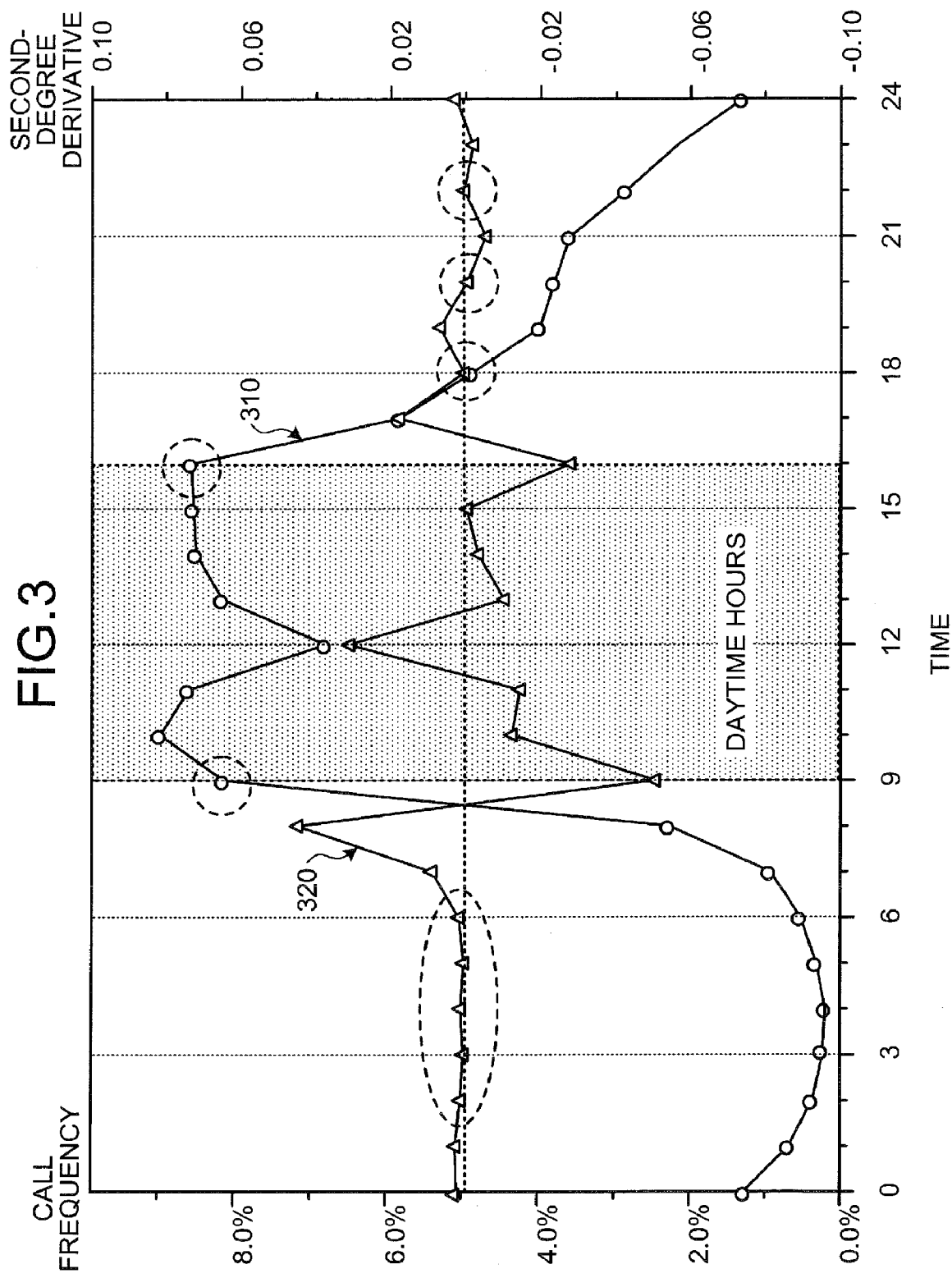
FIG. 3 is a diagram for explaining key hours characterizing call frequency distribution.

FIG. 3 is a diagram for explaining the key hour characterizing call frequency distribution. A curve 310 depicts call frequency distribution, which indicates the frequency of calls from customers to a contact center each hour (curve connecting white circles in FIG. 3). A curve 320 depicts a second-degree derivative of a distribution of the number of calls that indicates the number of calls from customers to the contact center each hour (curve connecting triangles in FIG. 3).

Concerning the curve 310, hours encompassed by dotted circles (9 a.m. and 4 p.m.) are key hours that indicate the boundary condition of daytime hours (9 a.m. to 4 p.m.) for which track records are available. Further, concerning curve 320, hours encompassed by the dotted circles (2 a.m. to 6 a.m., 6 p.m. and 10 p.m.) are key hours at which the value of the second-degree derivative of the distribution of the number of calls is substantially 0.

Points at which the value of the second-degree derivative of the distribution of the number of calls is substantially 0 are points near an inflection point. Near the inflection point, the distribution of the number of calls can be approximated by a straight line, and higher order components (likeliness of a change in the number of calls) that can cause errors in future estimation are few. The point (hour) at which the value of the second-degree derivative of the distribution is substantially 0 is frequently common among contact centers whose businesses are similar.

Therefore, in the present embodiment, times at which the value of the second-degree derivative is substantially 0 are selected as the key hours, and interpolation of call frequency is performed between the key hours and hours for which track records are available, thereby improving the accuracy of estimation. Moreover, by setting the boundary condition of hours in daytime for which track records are available as the key hours, the call frequency distribution during hours for which track records are available and the estimated call frequency distribution during hours for which track records are not available can be connected continuously and smoothly.

Figure 4:
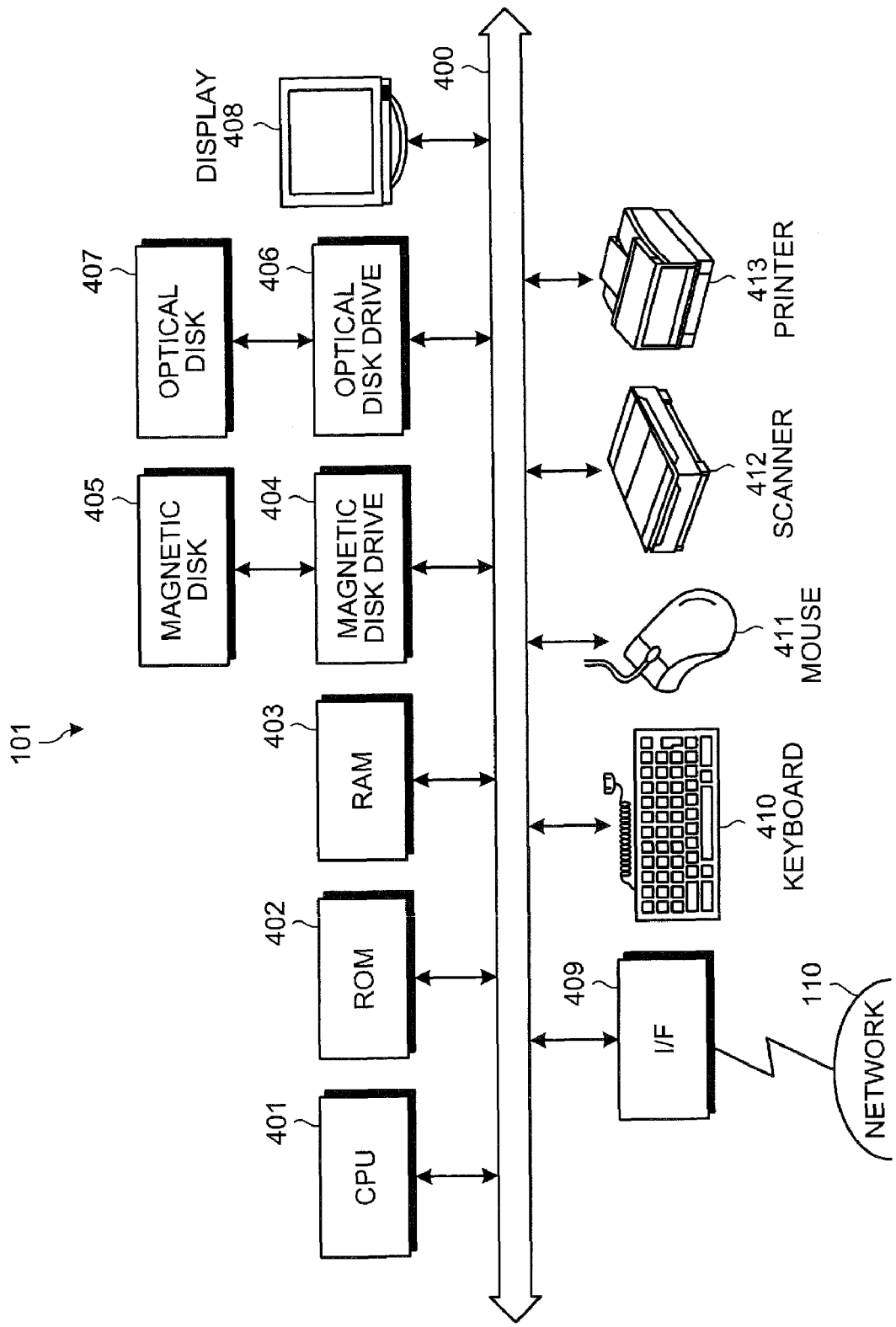
FIG. 4 is a hardware diagram of an access-frequency estimating apparatus according to the embodiment.

FIG. 4 is a hardware diagram of an access-frequency estimating apparatus according to the embodiment. As depicted in FIG. 4, an access-frequency estimating apparatus 101 includes a central processing unit (CPU) 401, a read-only memory (ROM) 402, a random access memory (RAM) 403, a magnetic disk drive 404, a magnetic disk 405, an optical disk drive 406, an optical disk 407, a display 408, an interface (I/F) 409, a keyboard 410, a mouse 411, a scanner 412, and a printer 413, connected to one another by way of a bus 400.

The CPU 401 governs overall control of the access-frequency estimating apparatus 101. The ROM 402 stores therein programs such as a boot program. The RAM 403 is used as a work area of the CPU 401. The magnetic disk drive 404, under the control of the CPU 401, controls the reading and the writing of data with respect to the magnetic disk 405. The magnetic disk 405 stores therein the data written under control of the magnetic disk drive 404.

The optical disk drive 406, under the control of the CPU 401, controls the reading and the writing of data with respect to the optical disk 407. The optical disk 407 stores therein the data written under control of the optical disk drive 406, the data being read by a computer.

The display 408 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 408.

The I/F 409 is connected to a network 110 such as a local area network (LAN), a wide area network (WAN), and the Internet through a communication line and is connected to other apparatuses through the network 110. The I/F 409 administers an internal interface with the network 110 and controls the input/output of data from/to external apparatuses. For example, a modem or a LAN adaptor may be employed as the I/F 409.

The keyboard 410 includes, for example, keys for inputting letters, numerals, and various instructions and performs the input of data. Alternatively, a touch-panel-type input pad or numeric keypad, etc. may be adopted. The mouse 411 performs the movement of the cursor, selection of a region, or movement and size change of windows. A track ball or a joy stick may be adopted provided each respectively has a function similar to a pointing device.

The scanner 412 optically reads an image and takes in the image data into the IP model creating apparatus. The scanner 412 may have an optical character recognition (OCR) function as well. The printer 413 prints image data and text data. The printer 413 may be, for example, a laser printer or an ink jet printer.

Figure 5:
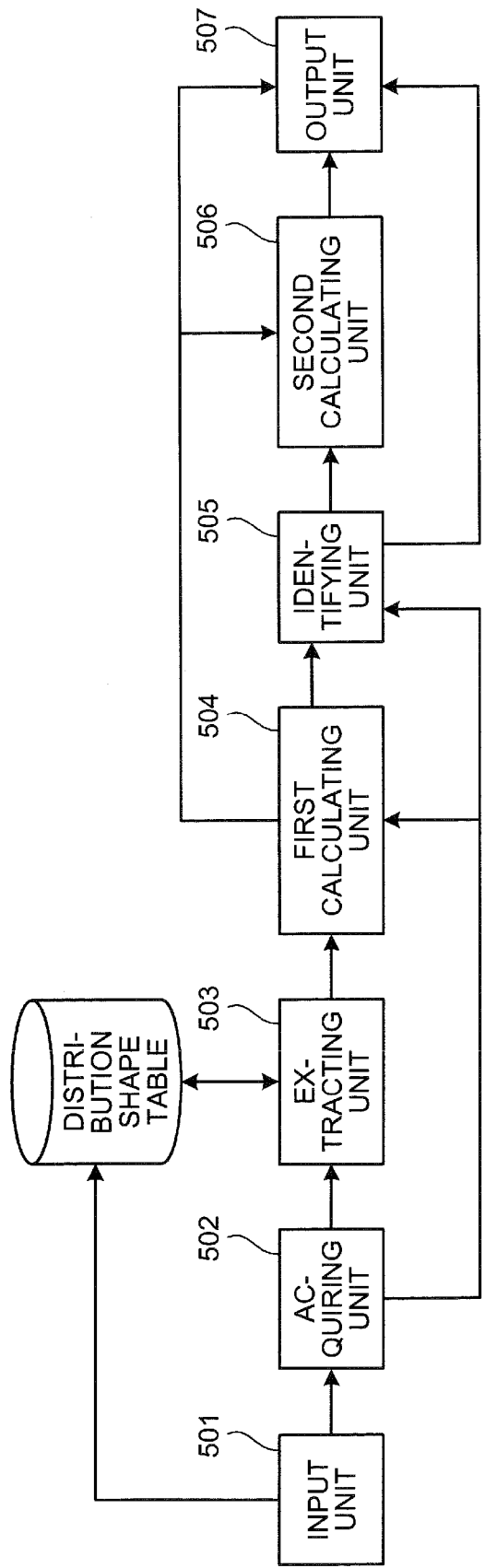
FIG. 5 is a functional diagram of an access-frequency estimating apparatus.

FIG. 5 is a functional diagram of an access-frequency estimating apparatus. The access-frequency estimating apparatus 101 includes an input unit 501, an acquiring unit 502, an extracting unit 503, a first calculating unit 504, an identifying unit 505, a second calculating unit 506, and an output unit 507.

These functions (the input unit 501 to the output unit 507) to be a control unit are implemented by causing the CPU 401 to execute a computer program stored in a storage area such as the ROM 402, the RAM 403, the magnetic disk 405, and the optical disk 407 depicted in FIG. 4 or by the I/F 409, for example. Furthermore, the functions at connection destinations indicated at arrowheads in FIG. 5 are implemented by reading from a storage area, data output from a connection origin, and by causing the CPU 401 to execute a relevant computer program.

The input unit 501 has a function of receiving input of parameter information related to hours outside operating hours in which the value of the second-degree derivative is nearly 0, and to a coefficient that indicates relation between call frequency for the operating hours of the contact center 100 and call frequency for hours outside the operating hours.

Call frequency distribution is a distribution indicating transition of call frequency with respect to time. The call frequency is a value obtained by dividing the number of calls each hour by the total number of calls during the day. For example, when the total number of calls from customers at the contact center 100 is 100 and the number of calls received in one hour from 4 o'clock is 10, the call frequency for 4 p.m. is "0.1 (10%)".

A contact center whose business is similar to that of the contact center 100 is one whose inquiries (questions, complaints, orders, etc.) from customers and the types of customers (sex, age, occupation, etc.) are similar to those of the contact center 100. Specifically, a contact center for which the shape of call frequency distribution for the same period of time as the operating time of the contact center 100 is one similar to the contact center 100.

In the present embodiment, contact centers are classified into a contact center for business users that receives questions, complaints, and the like from employees of a company and a contact center for end users that receives orders for products, questions, complaints, and the like from consumers.

The call frequency distribution of each contact center differs greatly in the distribution shape thereof depending on the type, "for business users" or "for end users". In the contact center for business users, call frequency tends to decrease monotonically as the number of workers working overtime decreases after business hours of the company.

On the other hand, in the contact center for end users, calls from customers that have come home temporarily increase in the evening (for example, after 5 p.m.). Therefore, the call frequency does not decrease monotonically but increases (or stays the same) at least briefly.

Hours outside the operating hours at which the value of the second-degree derivative of the call frequency distribution of other contact centers is nearly 0 are the hours outside the operating hours of the contact center 100, among the hours near an inflection point of the distribution of the number of calls at other contact centers. Nearly 0 means "0±Δ". The value of Δ can be arbitrarily set, and it is set to an infinitesimal value of, for example, "Δ=0.001 to 0.003".

Times outside the operating hours can be calculated using values of past records indicating the number of calls per hour during the operating hours of the other contact centers. The operating hours of the other contact centers include hours outside the operating hours of the contact center 100. Specifically, first, the second-degree derivative of the call frequency distribution of the other contact centers is acquired from past values of the number of calls at the other contact centers.

Hours for which the second-degree derivative is nearly 0 are checked with times outside the operating hours of the contact center 100 to identify hours outside the operating hours of the contact center 100 for which the second-degree derivative is nearly 0. Specifically, the hours for which the second-degree derivative is nearly 0 are checked with the operating hours of the contact center 100, and a user designates an hour outside the operating hours (evening-call inflection time, night-call convergence start time, early-morning call-starting time, etc. described hereinafter).

The coefficient can be obtained by regression analysis based on past values of the call frequency during the operating hours of the other contact centers and past values of the call frequency during hours outside the operating hours. Specifically, a coefficient that indicates relation between the call frequency during the operating hours of the other contact centers and the call frequency during the hours outside the operating hours can be obtained using, for example, a linear regression method.

This coefficient indicates a ratio of a mean value (or median) of the call frequency for each hour in a specific time period during the operating hours of the other contact centers to the call frequency for the hours outside the operating hours. More specifically, the coefficient indicates a ratio ("evening call ratio" described hereinafter) of a mean value of the call frequency for each hour in a daytime time period (12 p.m. to 4 p.m.) during the operating hours of the other contact centers to the call frequency for the hours outside the operating hours in a period in the evening (5 p.m. and 6 p.m.), for example.

The parameter information is input to the access-frequency estimating apparatus 101 by a user through operation of, for example, the keyboard 410 or the mouse 411 depicted in FIG. 4. The input parameter information is recorded in a distribution shape table that is implemented by a storage area such as the RAM 403, the magnetic disk 405, and the optical disk 407 depicted in FIG. 4.

A distribution shape table in which parameter information to be input when call frequency estimation of the contact center 100 for business users is performed is explained. FIG. 6 is a diagram depicting data recorded in the distribution shape table. As depicted in FIG. 6, in a distribution shape table 600, parameter information items 600-1 to 600-9 characterizing a distribution shape of a call frequency distribution of the contact center 100 are recorded.

Specifically, the parameter information items 600-1 to 600-9 respectively include a parameter name and a parameter value. A work start time is an average time of customers to start their works. A work end time is an average time of the customers to end their works. A lunch-break start time is an average time of lunch-break start time of the customers.

An early-morning call start time is time at which the frequency of calls from customers significantly changes in early morning hours (for example, 4 a.m. to 8 a.m.) outside the operating hours. This early-morning call start time, going back from the work start time, is the first time at which the second-degree derivative of the call frequency distribution of the other contact centers is nearly 0.

An evening-call inflection time is a time close to an inflection point of the call frequency distribution of the other contact centers during evening hours (for example, 5 p.m. and 6 p.m.) outside the operating hours. This evening-call inflection time is, for example, the first time, after the work end time, at which the second-degree derivative of the call frequency distribution of the other contact centers is nearly 0.

A night-call convergence end time is a time at which convergence of the frequency of calls from customers ends during night hours (for example, 7 p.m. to 9 p.m.) outside the operating hours. This night-call convergence end time is, for example, the first time, after the evening-call inflection time, at which the second-degree derivative of the call frequency distribution of the other contact centers is nearly 0.

An evening call ratio is a coefficient indicating a ratio of a mean value of the call frequency for each hour during daytime hours (for example, 12 p.m. to 4 p.m.) of the operating hours to the call frequency for evening hours (for example, 5 p.m. and 6 p.m.) outside the operating hours. A midnight call ratio is a coefficient indicating a ratio of a median of the call frequency for each hour during the operating hours (for example, 9 a.m. to 4 p.m.) to the call frequency for midnight hours (for example, 10 p.m., 23 p.m., and 12 a.m. to 3 a.m.).

The mean value of the call frequency in the above example is obtained by dividing a sum of the respective call frequencies for the hours from 12 p.m. to 4 p.m. during the daytime hours by five (the number of hours). The median of the call frequency in the above example is the call frequency for a median hour (either 12 p.m. or 1 p.m.) during a period from 9 a.m. to 4 p.m. during the operating hours.

An identical period is information that specifies hours outside the operating hours in which the same call frequency continues. Specifically, hours outside the operating hours in which the call frequency is identical successively for two periods of hours outside the operating hours are specified. For example, when the identical period is from 7 p.m. to 7 a.m. of the following day, the call frequency of the period continues to be the identical value.

The evening call ratio (the parameter information item 600-7) is correlated with the evening-call inflection time (the parameter information item 600-5). Moreover, the midnight call ratio (the parameter information item 600-8) is correlated with the early-morning call start time (the parameter information item 600-1) and the night-call convergence end time (the parameter information item 600-6).

A distribution shape table in which parameter information is input when call frequency estimation of the contact center 100 for end users is performed is explained. FIG. 7 is another diagram depicting data recorded in the distribution shape table. As depicted in FIG. 7, in a distribution shape table 700, parameter information items 700-1 to 700-13 characterizing the shape of call frequency distribution for the contact center 100 are recorded.

Specifically, the parameter information items 700-1 to 700-13 respectively include a parameter name and a parameter value. A night-call start time is a time at which changes in the frequency of calls from customers become small after an evening-call inflection time. This night-call start time is the first time, after the evening-call inflection time, at which the second-degree derivative of the call frequency distribution of the other contact centers is nearly 0.

The night-call convergence end time is a time at which convergence of the frequency of calls from customers starts after the night-call start time. This night-call convergence start time is, for example, the latest time among a group of times, after the night-call start time, at which the second-degree derivative of the call frequency distribution of the other contact centers is successively nearly 0.

Further, the night-call convergence end time is a time at which convergence of the frequency of calls from customers ends after the night-call convergence start time. This night-call convergence end time is, for example, the first time, after the night-call convergence start time, at which the second-degree derivative of the call frequency distribution of the other contact centers is nearly 0.

The evening call ratio (the parameter information item 700-9) is correlated with the value at the evening-call inflection time (the parameter information item 700-5). Further, the night call ratio (the parameter information item 700-10) is correlated with the values between the night-call start time (the parameter information item 700-6) and the night-call convergence start time (the parameter information item 700-7). Moreover, the midnight call ratio (the parameter information item 700-11) is correlated with the values between the early-morning call start time (the parameter information item 700-1) and the night-call convergence end time (the parameter information item 700-8).

The acquiring unit 502 has a function of acquiring past values of the call frequency for the operating hours of the contact center 100. For example, the acquiring unit 502 acquires past values of the call frequency for each hour of the operating hours from 9 a.m. to 4 p.m. of the contact center 100. The past values of the call frequency can be directly input to the access-frequency estimating apparatus 101, or can be acquired from an external computer device (for example, the switchboard 103).

Figure 8:
FIG. 8 is a diagram for explaining an example of past data.

FIG. 8 is a diagram for explaining an example of past data. Past data 800 depicted in FIG. 8 includes respective call frequencies CF(9) to CF(16) for hours from 9 a.m. to 4 p.m. during the operating hours of the contact center 100. CF(t) is a past value of the call frequency at time t. The call frequencies CF(9) to CF(16) are calculated from past call records of the contact center 100 that are accumulated in the switchboard 103, for example.

The extracting unit 503 has a function of extracting a coefficient that correlates the call frequency during the operating hours of the contact center 100 and the call frequency for an arbitrary hour selected from among hours outside the operating hours, from the distribution shape table (for example, the distribution shape table 600 or 700).

For example, when the evening-call inflection time is selected from among hours (the early-morning call start time, the evening-call inflection time, and the night-call convergence end time) outside the operating hours that are recorded in the distribution shape table 600, the parameter information item 600-6 that is correlated with the parameter information item 600-5 is extracted. In this example, the coefficient is the evening call ratio "0.50".

The first calculating unit 504 has a function of calculating an estimated value of the call frequency for an arbitrary hour outside the operating hours of the contact center 100, based on a past value of the call frequency during the operating hours acquired by the acquiring unit 502 and the coefficient extracted by the extracting unit 503. Specifically, the first calculating unit 504 can calculate an estimated value of the call frequency for an arbitrary hour outside the operating hours, for example, using any one of equations (1) to (3).

Equations (1) to (3) are estimation equations that are obtained from regression analysis based on past values of the call frequency for the operating hours of the other contact centers and past values of the call frequency for hours outside the operating hours. Equations (1) to (3) can be directly input to the access-frequency estimating apparatus 101, or can be acquired from an external computer device.

When input or acquired, equations (1) to (3) are correlated with coefficients respectively corresponding thereto to be stored in a storage area such as the RAM 403, the magnetic disk 405, and the optical disk 407 depicted in FIG. 4. Estimation of the call frequencies for hours outside the operating hours are explained below for each selected hour outside the operating hours.

When the evening-call inflection time is selected, ECF(t) is an estimated value of call frequency at the evening-call inflection time t; A1(t1, t2) is a mean value of respective frequencies for hours from the lunch-break start time t1 to the work end time t2; and ER is the evening call ratio.

$$ECF(t) = A1(t1,t2) \times ER \tag{1}$$

The mean value A1(t1, t2) is calculated by the first calculating unit 504, as a result in which the coefficient corresponding to the evening-call inflection time is extracted by the extracting unit 503, using a past value of a call frequency during the operating hours that is acquired by the acquiring unit 502.

When the early-morning call start time or the night-call convergence end time is selected, MCF(t) is an estimated value of the call frequency at the early-morning call start time; NCE is an estimated value of the call frequency at the night-call convergence end time; M(t1, t2) is a median of the respective call frequencies for the hours during the operating hours (time t1 to time t2) of the contact center 100; and MR is the midnight call ratio.

$$MCF(t) = NCEF(t) = M(t1,t2) \times MR \tag{2}$$

The median of t1 and t2 is identified by the first calculating unit 504, as a result in which the coefficient corresponding to the early-morning call start time or the night-call convergence end time is extracted by the extracting unit 503, using a past value of a call frequency during the operating hours.

When the night-call start time or the night-call convergence start time is selected, NCF(t) is an estimated value of the call frequency at the night-call start time t; NCSF(t) is an estimated value of the call frequency at the night-call convergence start time; and A2(t1, t2) is a mean value of respective call frequencies for hours during the operating hours (time t1 to time t2) of the contact center 100. NR is the night call ratio.

$$NCF(t) = NCSF(t) = A2(t1, t2) \times NR \tag{3}$$

The mean value A2(t1, t2) is calculated by the first calculating unit 504, as a result in which the coefficient corresponding to the night-call start time or the night-call convergence start time is extracted by the extracting unit 503, using a past value of a call frequency during the operating hours.

The identifying unit 505 has a function of identifying an estimated value of the call frequency for an hour between a first hour outside the operating hours and a second hour outside the operating hours using the estimated value of the call frequency for the hour outside the operating hours calculated by the first calculating unit 504 and the first and the second hours outside the operating hours that specify hours outside the operating hours in which the call frequency continues to be identical.

With the aid of the data stored in the distribution shape table 600 depicted in FIG. 6, for example, when the estimated value (for example, 1%) of the call frequency of the night-call convergence end time (9 p.m.) is calculated by the first calculating unit 504, the identifying unit 505 identifies by referring to the parameter information 600-9, hours outside the operating hours from 9 p.m. to 7 a.m. of the following day in which the call frequency continues to be identical, and then identifies the call frequency for a period from 9 p.m. to 7 a.m. as 1% (0.01).

The second calculating unit 506 has a function of calculating an estimated value of the call frequency for hours outside the operating hours other than the arbitrary hour outside the operating hours of the contact center 100, based on a past value of a call frequency for the operating hours of the contact center 100 and the estimated value of the call frequency for the arbitrary hour outside the operating hours that is calculated by the first calculating unit 505.

Specifically, the call frequency for hours other than the arbitrary hour can be interpolated using the past value of the respective call frequencies for the hours during the operating hours of the contact center 100 and the estimated value of the call frequency of the arbitrary hour, for example. As an interpolation method, for example, a conventional mathematical method such as spline interpolation can be used.

Furthermore, the second calculating unit 506 can interpolate the call frequency for the hours other than the arbitrary hour further using the estimated value of the call frequency for the hour between the first hour outside the operating hours and the second hour outside the operating hours identified by the identifying unit 505.

The output unit 507 has a function of outputting the estimated value of the call frequency that is calculated by the first calculation unit 504 and/or the second calculating unit 506. Moreover, the output unit 507 may output the estimated value of the call frequency for the hour between the first hour outside the operating hours and the second hour outside the operating hours identified by the identifying unit 505.

An output form of the output unit 507 can be, for example, display on the display 408, print out by the printer 413, and transmission to an external device by the I/F 409. Further, output may be in the form of storage to a storage area such as the RAM 403, the magnetic disk 405, and the optical disk 407.

A call-frequency distribution table that stores estimated values of the respective call frequencies for hours outside the operating hours based on the data recorded in the distribution shape table 600 is explained with the contact center 100 for business users as an example. FIG. 9 to FIG. 14 are diagrams depicting data recorded in the call-frequency distribution table. The call-frequency distribution table is implemented by a storage area such as the RAM 403, the magnetic disk 405, and the optical disk 407.

Figure 9:
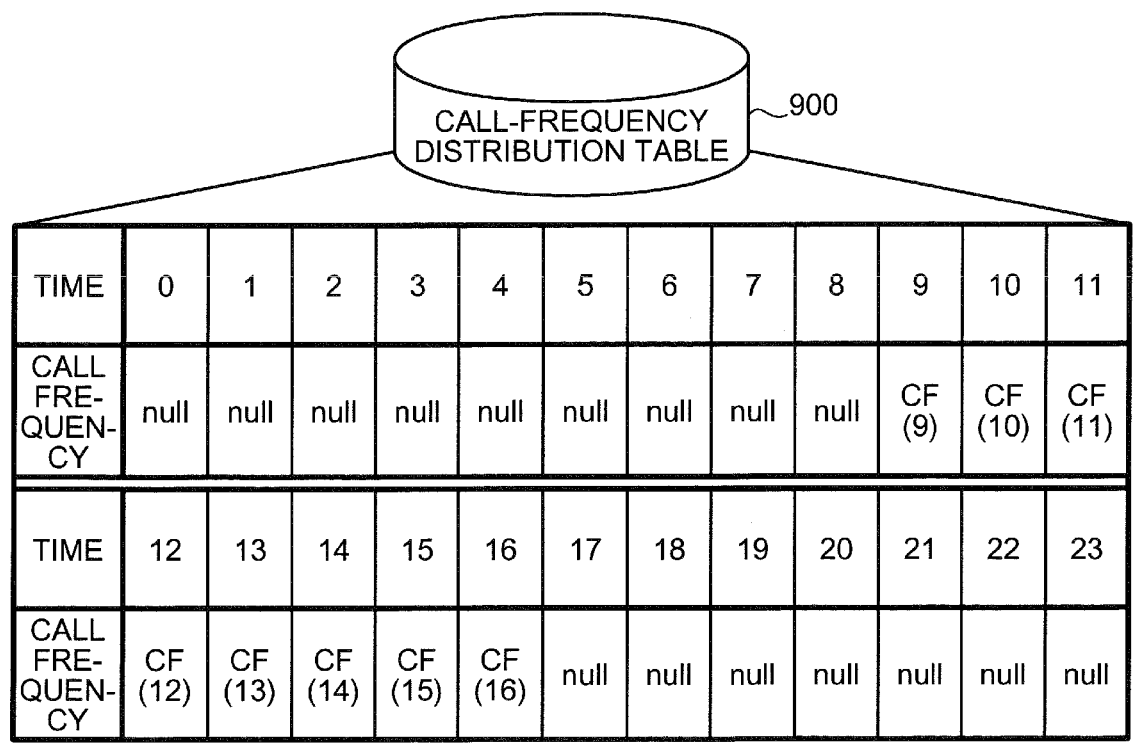
FIG. 9 to FIG. 14 are diagrams depicting data recorded in the call-frequency distribution table.

When the past data 800 is acquired by the acquiring unit 502, the respective call frequencies CF(9) to CF(16) for the hours from 9 a.m. to 4 p.m. during the operating hours of the contact center 100 are recorded in a call-frequency distribution table 900 as depicted in FIG. 9. The call frequency for each hour outside the operating hours is expressed as "null".

Figure 10:
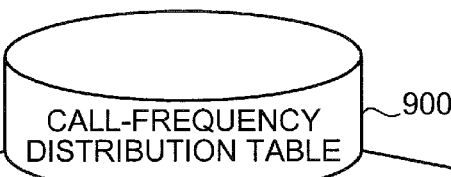

Next, when the estimated value of the call frequency at the early-morning call start time (7 a.m.) outside the operating hours is calculated by the first calculating unit 504, a call frequency MCF(7) for 7 a.m., which is outside the operating hours of the contact center 100, is recorded in the call-frequency distribution table 900 as depicted in FIG. 10.

Figure 11:

Subsequently, when the estimated value of the call frequency at the evening-call inflection time (6 p.m.) outside the operating hours is calculated by the first calculating unit 504, a call frequency ECF(18) for 6 p.m., which is outside the operating hours of the contact center 100, is recorded in the call-frequency distribution table 900 as depicted in FIG. 11.

Figure 12:
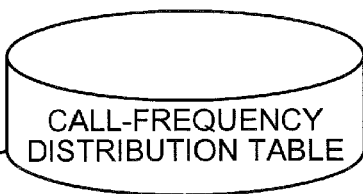

Next, when the estimated value of the call frequency at the night-call convergence end time (9 p.m.) outside the operating hours is calculated by the first calculating unit 504, a call frequency NCEF(21) for 9 p.m., which is outside the operating hours of the contact center 100, is recorded in the call-frequency distribution table 900 as depicted in FIG. 12. The call frequency MCF(7) for 7 a.m. and the call frequency NCEF(21) for 9 p.m. are identical.

Figure 13:
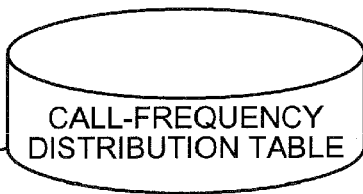

Subsequently, when the estimated value of the call frequency for the hours outside the operating hours (9 p.m. to 7 a.m. of the following day) in which the call frequency continues to be identical are identified by the identifying unit 505, the call frequency NCEF(21) (or the call frequency MCF(7) for 7 a.m.) for 10 p.m. to 6 a.m. of the following day is recorded in the call-frequency distribution table 900 as depicted in FIG. 13.

Figure 14:
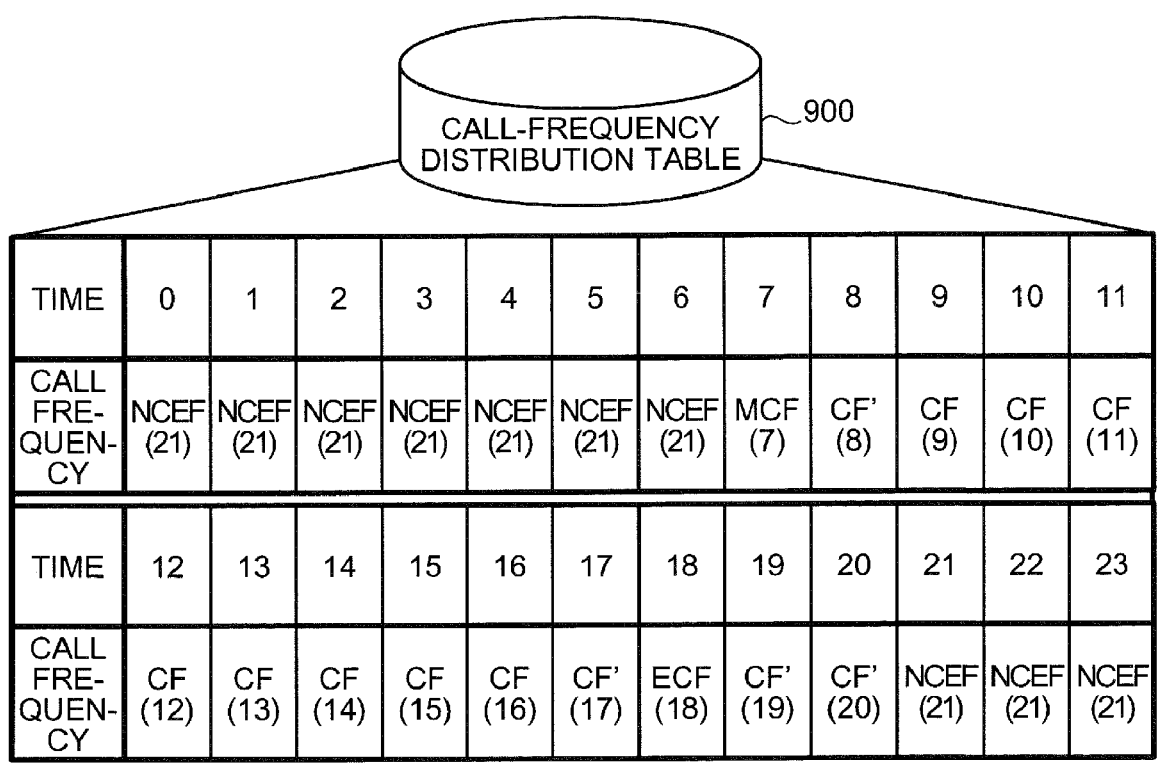

Finally, when the estimated value of the call frequencies for the other hours (8 a.m., 5 p.m., 7 p.m., and 8 p.m.) outside the operating hours are calculated by the second calculating unit 506, call frequencies CF'(8) CF'(17), CF'(19) and CF'(20) respectively for 8 a.m., 5 p.m., 7 p.m., and 8 p.m., which are outside the operating hours of the contact center 100, are respectively recorded in the call-frequency distribution table 900 as depicted in FIG. 14.

The output unit 50 outputs the data recorded in the call-frequency distribution table 900 depicted in FIG. 14 as a call frequency distribution of the extended operating hours of the contact center 100. Thus, an administrator of the contact center 100 can obtain the estimated value of the call frequency for each hour of the extended operating hours.

In this example, the respective call frequencies CF(9) to CF(16) for the hours during the operating hours obtained from the past data 800 are directly recorded. Therefore, a cumulative call frequency of all hours recorded in the call-frequency distribution table 900 depicted in FIG. 14 does not become 1 (100%). However, by normalizing the call frequency of each hour, the cumulative call frequency of all hours can be 1 (100%).

Figure 15:
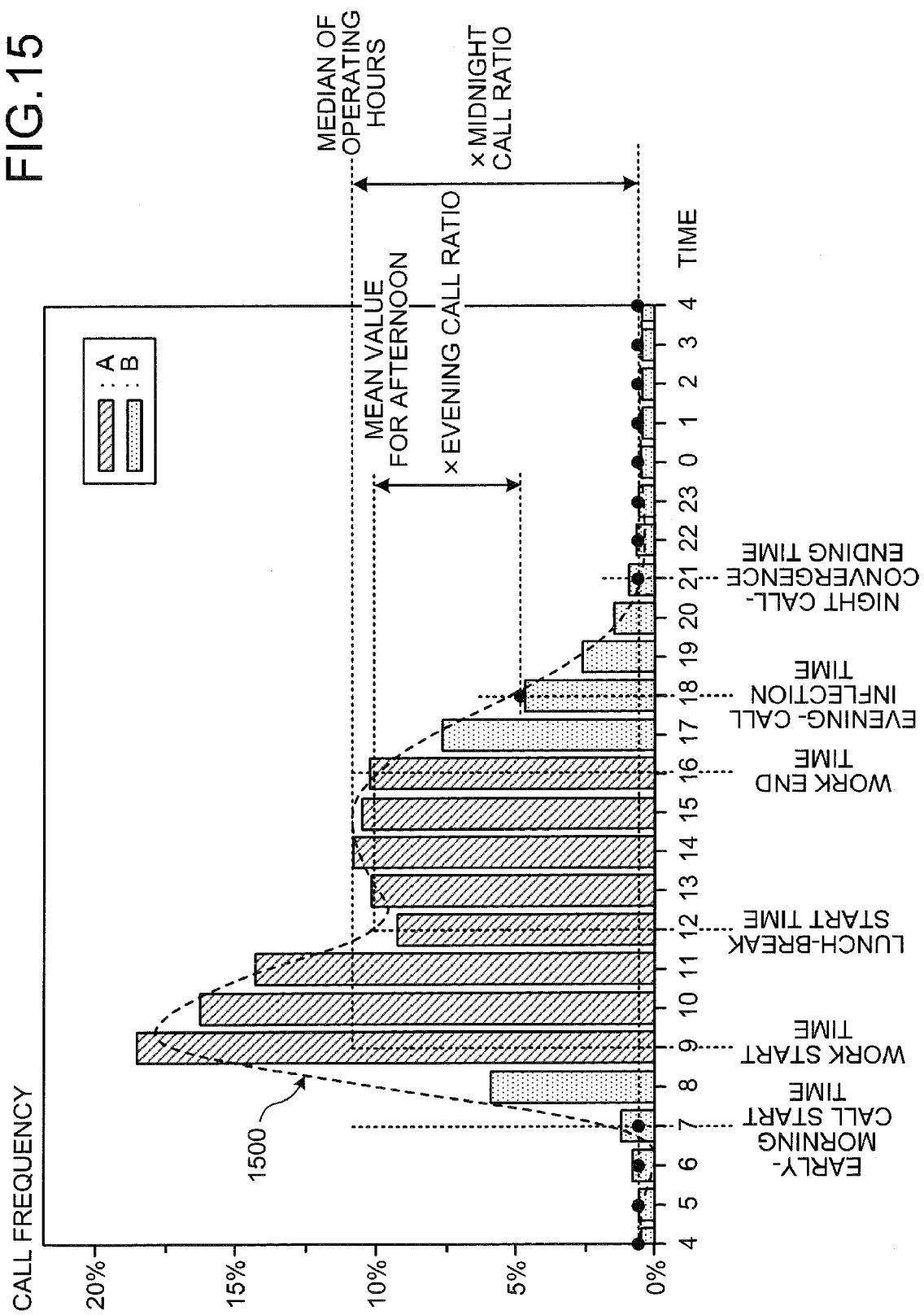
FIG. 15 is a diagram for explaining an example of an estimation result.

FIG. 15 is a diagram for explaining an example of an estimation result. A curve 1500 depicted in FIG. 15 indicates a call frequency distribution during the extended operating hours of the contact center 100 for business users. This call frequency distribution is a result of estimation of the call frequency for hours outside the operating hours performed by a method explained in the present embodiment.

Bars A of the graph depicted in FIG. 15 indicate past values of the call frequency during the operating hours of the contact center 100 before extension of the operating hours. Bars B of the graph depicted in FIG. 15 indicate past values of the call frequency during operating hours added as a result of the extension of the operating hours of the contact center 100. Black dots in FIG. 15 indicate times at which the second-degree derivative of the call distribution of the other contact centers is nearly 0.

As depicted in FIG. 15, the curve 1500 at the extended hours matches well with the past values of the call frequency for the extended hours of the contact center 100. Furthermore, by setting times to identify the operating hours before extension thereof as a boundary condition, the shape of the call frequency distribution for all operating hours after the extension has a continuous and smooth shape.

While in the present embodiment, as the parameter information, hours outside the operating hours in which the second-degree derivative of the call distribution of the other contact centers is nearly 0, various (proportionality) coefficients, and information that identifies hours in which the call frequency is identical are directly input to the access-frequency estimating apparatus 101, configuration is not limited hereto. For example, information corresponding to the above parameter information can be automatically created by supplying past values of the call frequency for the operating hours of the contact center 100 and past values of the call distribution of the other contact centers to the access-frequency estimating apparatus 101.

Specifically, the second-degree derivative is calculated from past values of the call distribution of the other contact centers, and hours outside the operating hours in which the second-degree derivative is nearly 0 and hours in which the call frequencies are identical can be identified. Further, by performing regression analysis based on past values of the call frequency for the other contact centers in the identified hours outside the operating hours and past values of the call frequency in the operating hours, various coefficients and model functions (for example, the above equations (1) to (3)) can be acquired.

However, a user must designate, in advance, a criterion for determining which hour as the hour outside the operating hours (for example, the early-morning call start time, the evening-call inflection time, the night call-convergence starting/ending time, etc.) among a group of hours in which the second-degree derivative of the call distribution of the other contact centers is nearly 0. Thus, it is possible to save a user the trouble of creating the parameter information each time the target contact center is changed.

Moreover, while in the present embodiment, the operating hours after extension thereof of the contact center 100 are 24 hours, by supplying information to identify extended hours to the access-frequency estimating apparatus 101, the estimated value of the call frequency for arbitrary extended hours can be acquired. The method explained in the present embodiment can be applied to estimation of the number of calls outside the operating hours of the contact center 100.

Figure 16:
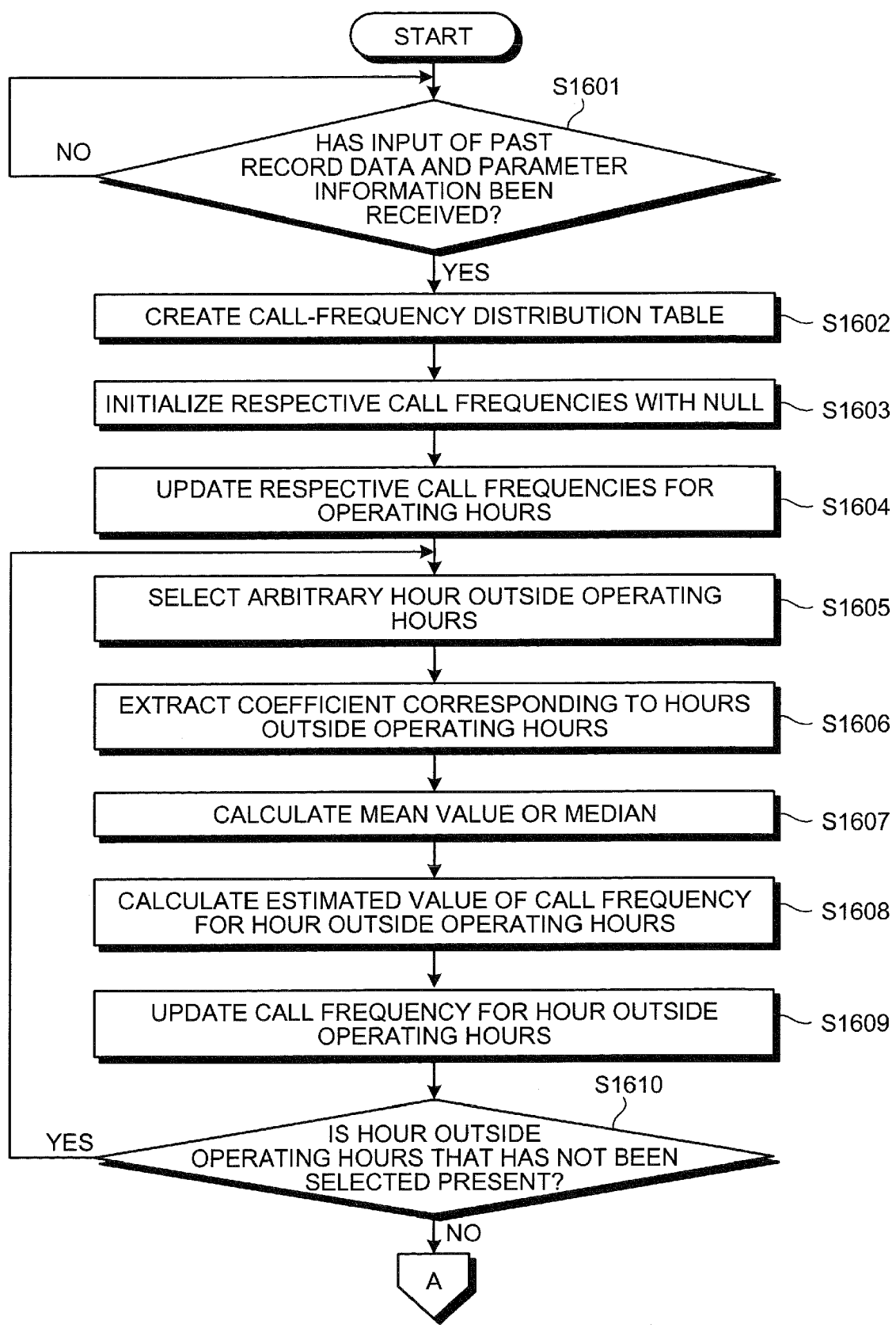
FIG. 16 and FIG. 17 are flowcharts depicting one example of call-frequency estimating processing performed by the access-frequency estimating apparatus.
Figure 17:
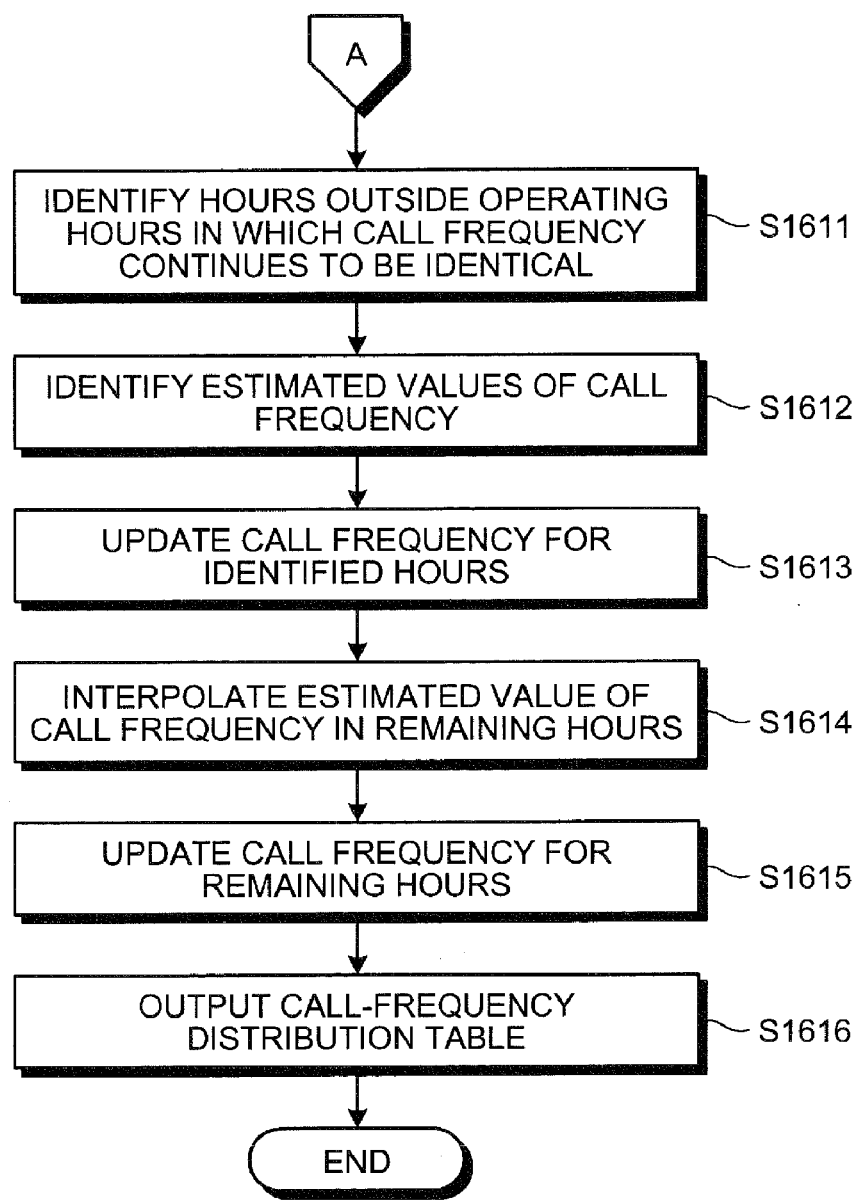

FIG. 16 and FIG. 17 are flowcharts depicting one example of call-frequency estimating processing performed by the access-frequency estimating apparatus.

In the call-frequency estimating processing explained below, for example, when past data and parameter information are input to the access-frequency estimating apparatus 101 by a user operating the keyboard 410 or the mouse 411 depicted in FIG. 4, a series of processes at steps S1601 to S1616 are automatically executed by a computer.

In the flowchart depicted in FIG. 16, first, it is determined whether the input unit has received an input of past data (for example, the past data 800) and parameter information (for example, the parameter information items 600-1 to 600-9, 700-1 to 700-13) (step S1601).

Waiting occurs until past data and parameter information are input (step S1601: NO), and when input (step S1601: YES), a call-frequency distribution table (for example, the call-frequency distribution table 900) to record estimated values of the call frequency of respective hours outside the operating hours of the contact center 100 is created (step S1602), and the respective call frequencies for the hours are initialized with "null" (step S1603).

Thereafter, based on the past data input at step S1601, the call frequency for each hour of the operating hours is updated (step S1604). Next, with reference of data recorded in the distribution shape table (for example, the distribution shape table 600 or 700) in which the parameter information input at step S1601 is recorded, an arbitrary hour is selected from among hours outside the operating hours (step S1605).

The extracting unit 503 then extracts a coefficient that indicates relation between the call frequency during the operating hours and the arbitrary hour selected at step S1605 from the distribution shape table (step S1606). Here, a model function (for example, the above equations (1) to (3)) that is correlated with the coefficient to be extracted is read from a storage area such as the RAM 403, the magnetic disk 405, and the optical disk 407.

Subsequently, the first calculating unit 504 calculates a mean value or a median of a specific period of the operating hours to be identified, using the past data input at step S1601 (step S1607)

The first calculating unit 504 then calculates an estimated value of the call frequency for the arbitrary hour outside the operating hours, using the coefficient extracted at step S1606 and the mean value or the median calculated at step S1607 (step S1608). Specifically, the first calculating unit 504 calculates the estimated value of the call frequency of the arbitrary hour by providing the coefficient and the mean value (or the median) to the model function read from the storage area.

Next, the call frequency for the arbitrary hour outside the operating hours in the call-frequency distribution table is updated (step S1609). It is then determined whether an hour that has not yet been selected from among the hours outside the operating hours is present (step S1610). When an hour that has not yet been selected is present (step S1610: YES), the process returns to step S1605 to select the hour that has not been yet selected. On the other hand, when an hour that has not yet been selected is not present (step S1610: NO), the process proceeds to step S1611 depicted in FIG. 17.

In the flowchart depicted in FIG. 17, first, the identifying unit 505 identifies hours outside the operating hours in which the call frequency continues to be identical, referring to the data stored in the call-frequency distribution table and the distribution shape table (step S1611), and identifies the estimated value of the call frequency for each hour among the identified hours (step S1612).

Subsequently, the call frequency for each hour identified at step S1612 is updated in the call-frequency distribution table (step S1613). Thereafter, the second calculating unit 506 interpolates the estimated value of the call frequency for remaining hours that are outside the operating hours, referring to the data stored in the call-frequency distribution table (step S1614).

The call frequencies for the remaining hours that are outside the operating hours interpolated at step S1614 are updated in the call-frequency distribution table (step S1615), and finally, the output unit 507 outputs the call-frequency distribution table (step S1616). Thus, a series of processes in the flowchart ends.

As described above, according to the present embodiment, the call frequency for hours outside operating hours characterizing the call frequency distribution outside the operating hours can be calculated using past values of the call frequency for the operating hours of the contact center 100 for which the estimation is performed. As the hours outside the operating hours, hours having small hourly fluctuation in the call frequency common among contact centers in similar fields of business are designated, thereby suppressing an error in the interpolation, and as a result, the estimated value of the call frequency for hours outside the operating hours can be accurately acquired.

Moreover, hours to identify operating hours before extension thereof are set as the boundary condition, thereby making the shape of the call frequency distribution for all operating hours after extension continuous and smooth, and as a result, it can be expressed as a more realistic distribution shape.

Thus, the call frequency for hours outside the operating hours of the contact center 100 can be accurately grasped, and the appropriate number of operators to be placed during extended hours can be obtained. As a result, it is possible to prevent degradation in customer satisfaction and the loss of business opportunities, as well as increases in operating costs due to an excessive number of personnel. Moreover, cost-benefit performance can be optimized.

Figure 18:
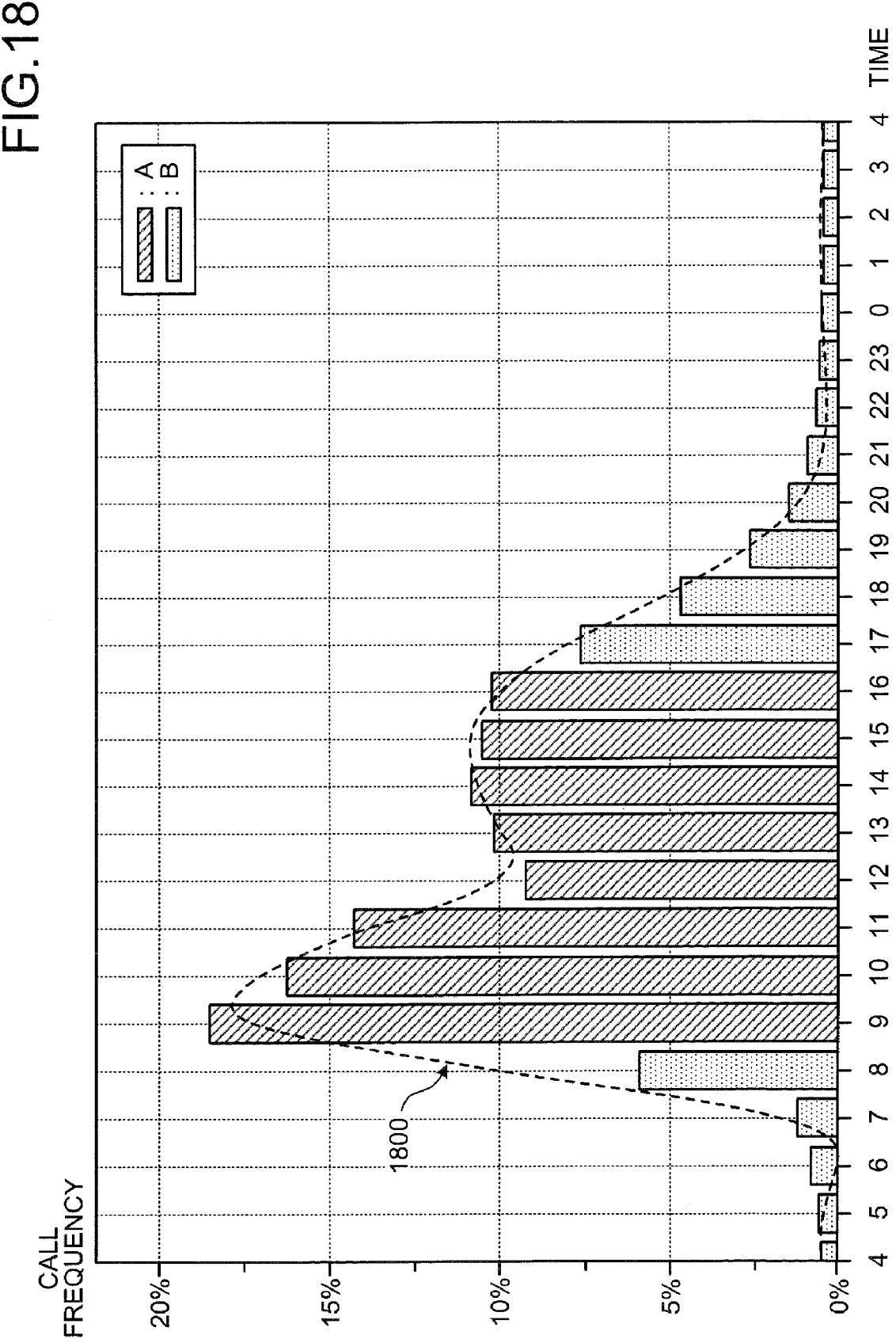
FIG. 18 is a diagram for explaining an estimation result concerning a contact center for companies involved in a server related business.
Figure 19:
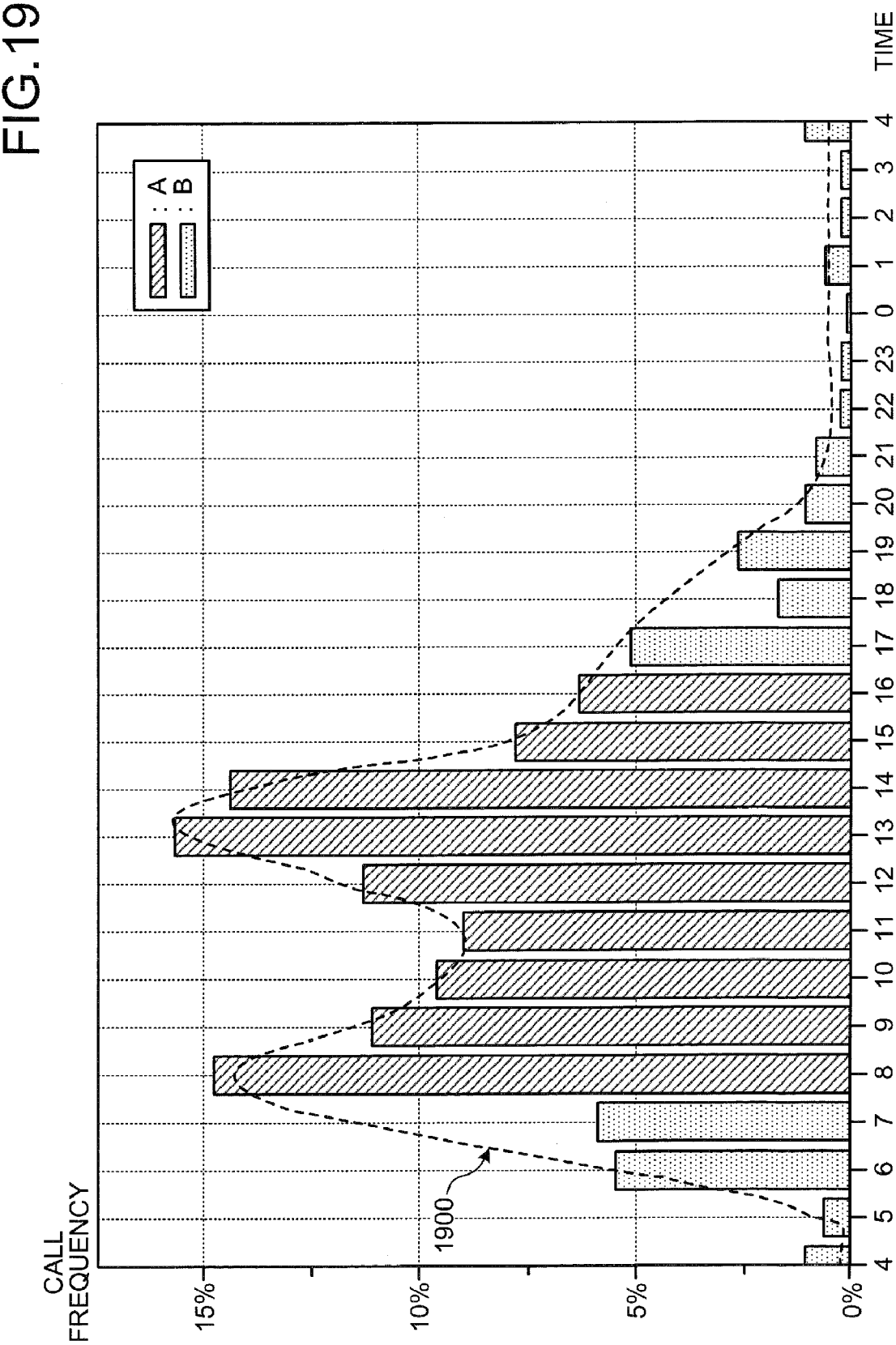
FIG. 19 is a diagram for explaining an estimation result concerning a contact center for companies involved in a point of sale (POS) terminal.

Estimation results of the call frequency distribution of the contact centers 100 in different businesses obtained using the method explained in the present embodiment are depicted in FIG. 18 to FIG. 20. In FIG. 18 to FIG. 20, curves 1800 to 2000 indicated by a dotted line are the results of the estimation of the call frequency distribution. Bars A indicate record values of the call frequency during the operating hours of the contact center 100 before extension thereof, and bars B indicate record values of the call frequency during extended hours of the contact center 100 after the extension.

FIG. 18 is a diagram for explaining an estimation result concerning a contact center for companies involved in a server related business. As depicted in FIG. 18, the curve 1800 at the extended hours matches well with the record values of the call frequency during the operating hours of the contact center 100 after extension thereof.

FIG. 19 is a diagram for explaining an estimation result concerning a contact center for companies involved in a point of sale (POS) terminal. As depicted in FIG. 19, the curve 1900 at the extended hours matches well with the record values of the call frequency during the operating hours of the contact center 100 after extension thereof. Particularly, the distribution shape (not a monotonic decrease) from 5 p.m. to 7 p.m. is accurately expressed.

FIG. 20 is a diagram for explaining an estimation result concerning a contact center for end users having a number of abandoned calls. As depicted in FIG. 20, the curve 2000 at the extended hours matches well with the record values of the call frequency during the operating hours of the contact center 100 after extension thereof. Particularly, the distribution shape (small fluctuation) from 6 p.m. to 9 p.m. is accurately expressed.

The access-frequency estimating method explained in the present embodiment can be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program can be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A non-transitory computer-readable recording medium storing therein an access-frequency estimating program that causes a computer capable of accessing a table recording hours that are outside operating hours and for which a second-degree derivative of access frequency distribution corresponding to a plurality of contact centers whose business is similar to that of a contact center subject to estimation is nearly 0, and a coefficient that indicates relation between access frequency during operating hours of the other contact centers and access frequency outside the operating hours, to execute:

acquiring a past access frequency for an operating hour of the contact center;

extracting, from the table, a coefficient that expresses relation between access frequency during the operating hours and an arbitrary hour selected from among the hours outside the operating hours;

calculating an estimated access frequency for the arbitrary hour of the contact center, based on the past access frequency acquired at the acquiring and the coefficient extracted at the extracting; and outputting the estimated access frequency calculated at the calculating.

2. The non-transitory computer-readable recording medium according to claim 1, wherein the calculating further includes calculating the estimated access frequency for the arbitrary hour by providing a mean value of respective access frequencies for hours in a specific period of the operating hours and the coefficient extracted at the extracting to a function expressing relation between access frequency for the specific period and the access frequency for the arbitrary hour.

3. The non-transitory computer-readable recording medium according to claim 1, wherein the access-frequency estimating program further causes the computer to execute:

calculating an estimated access frequency for an hour outside the operating hours exclusive of the arbitrary hour, based on the past access frequency for the operating hour and the estimated access frequency for the arbitrary hour calculated at the calculating the estimated access frequency for the arbitrary hour, wherein the outputting further includes outputting the estimated access frequency calculated at the calculating the estimated access frequency for the hour outside the operating hours.

4. The non-transitory computer-readable recording medium according to claim 3, wherein the calculating the estimated access frequency for the hour outside the operating hours includes calculating the estimated access frequency for the hour by interpolating the access frequency for the hour using past access frequencies respectively corresponding to each hour among the operating hours and the estimated access frequency for the arbitrary hour.

5. The non-transitory computer-readable recording medium according to claim 4, wherein the table includes a first outside hour and a second outside hour indicative of hours outside the operating hours for which the access frequency continues to be identical, the access-frequency estimating program further causes the computer to execute identifying an estimated access frequency for an hour between the first outside hour and the second outside hour using an estimated access frequency outside the operating hours calculated at the calculating the estimated access frequency for the arbitrary hour and, the first outside hour and the second outside hour stored in the table, and the calculating the estimated access frequency for the hour outside the operating hours includes interpolating the access frequency for the hour using the estimated access frequency for the hour between the first outside hour and the second outside hour identified at the identifying.

6. An access-frequency estimating apparatus comprising:

a storage unit that stores therein hours that are outside operating hours and for which a second-degree derivative of access frequency distribution corresponding to a plurality of contact centers whose business is similar to that of a contact center subject to estimation is nearly 0, and a coefficient that indicates relation between access frequency during operating hours of the other contact centers and access frequency outside the operating hours;

an acquiring unit that acquires a past access frequency for an operating hour of the contact center;

an extracting unit that extracts, from the storage unit, a coefficient that expresses relation between access frequency during the operating hours and an arbitrary hour selected from among the hours outside the operating hours;

a first calculating unit that calculates an estimated access frequency for the arbitrary hour of the contact center, based on the past access frequency acquired by the acquiring unit and the coefficient extracted by the extracting unit; and an output unit that outputs the estimated access frequency calculated by the calculating unit.

* * * * *